May 31, 1932.　　　　C. WANINGER　　　　1,860,756
HYDRAULIC BRAKE
Filed Oct. 29, 1928
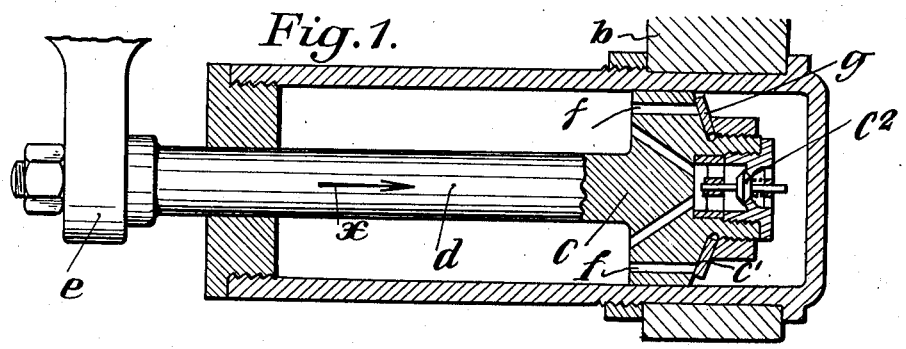
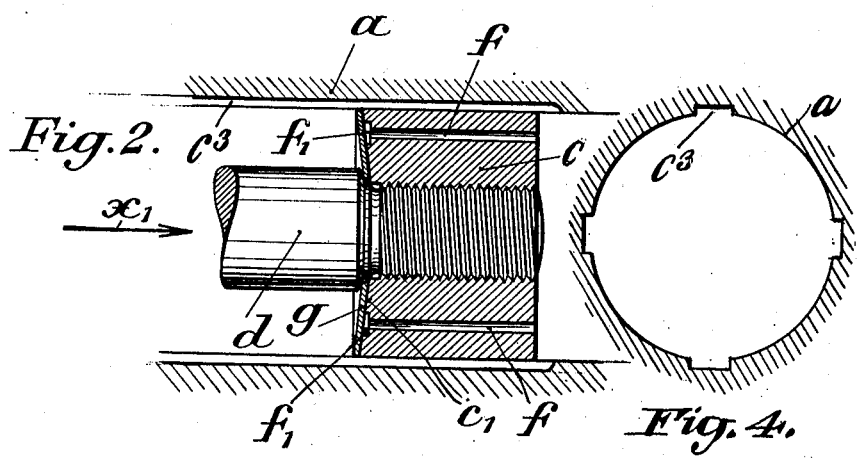
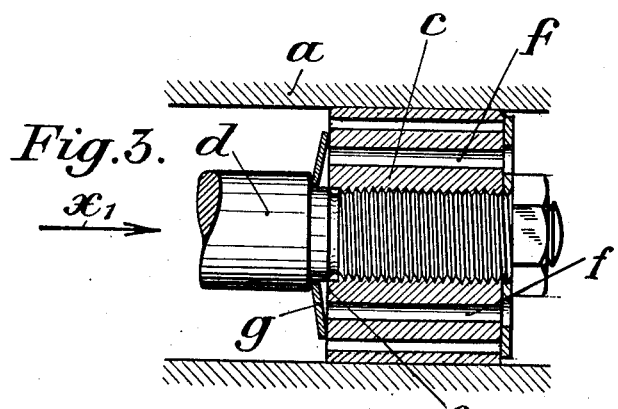
INVENTOR
Carl Waninger
BY
ATTORNEY.

Patented May 31, 1932

1,860,756

UNITED STATES PATENT OFFICE

CARL WANINGER, OF DUSSELDORF, GERMANY, ASSIGNOR TO THE FIRM RHEINISCHE METALLWAAREN- UND MASCHINENFABRIK, OF DUSSELDORF-DERENDORF, GERMANY

HYDRAULIC BRAKE

Application filed October 29, 1928, Serial No. 315,845, and in Germany May 16, 1928.

The invention consists in the particular construction of a hydraulic brake in which the openings for the passage of the liquid in the brake piston are covered by spring loaded valves, and in which the magnitude of the braking force is controlled by the spring loading of these valves which open during the working of the brake.

For this purpose strong valve springs are necessary, since in hydraulic brakes of this type which can be applied to guns, but more particularly also to buffers of railway vehicles, large braking pressures and forces of considerable magnitude are generally concerned; for example in a railway buffer the valve only opens at a pressure of about 400 kilograms per square centimetre and a braking force of about 45 tons can be exerted. In the arrangement of the separate valve plates with these loaded springs, the masses to be moved become so great, that during the braking process they are set into relatively slow oscillation and, during a complete stroke of the brake, the brake pressures and brake forces are very unequal and vary considerably.

The object of the invention is to remove these disturbing effects by making the valve masses as small as possible, and this is obtained by omitting a special valve member, the valve spring itself acting also as the member closing the apertures for the flow of the liquid.

If several apertures for the flow are provided, each of these can be closed by a separate valve spring; but preferably, all the openings in the piston are closed by a plate spring, either a shell shaped plate spring or a plane plate. The surface of the spring plate may lie closely against the openings of the different passages, or open ends of the passages may be connected together by an annular passage arranged close to the elastically lifted edge of the plate spring, so that the hydraulic pressure is effective during the working stroke of the brake immediately over a large surface of the plate. The valve spring is initially stressed to a greater or less extent in dependence on the brake force required, or the force of the spring can be increased by correspondingly larger dimensions and a steeper characteristic obtained without applying an initial stress.

The accompanying drawings show in longitudinal section examples of constructions of brake valves according to the invention.

Figure 1 is a cross sectional view of a hydraulic brake in which the piston is stationary and the cylinder is movable, Figure 2 is a part sectional view of a brake in which the cylinder is stationary and the piston movable, Figure 3 is a part sectional view of a modified piston construction, and Figure 4 is a cross-sectional view of the cylinder showing the channels of Fig. 2.

Figure 1 illustrates a hydraulic brake for guns in which in known manner the brake cylinder $a$ filled with liquid is rigidly connected by an extension $b$ with the gun barrel (not shown), so that on firing it recoils in the direction shown by the arrow $x$. The brake piston $c$ is held stationary by the piston rod $d$ being connected to a projection $e$ on the barrel slide. The piston $c$ has several continuous passages $f$ for the flow of the brake liquid from one side to the other of the piston during the stroke of the latter. Its front surface $c'$, opposite to the piston rod, is slightly cone-shaped forward. According to the invention a shell-shaped plate spring $g$ is pressed by a nut against this surface and closes the ends of the passages $f$. The plate spring has, preferably, a pointed surface referring to surface $c'$ of the piston so that by screwing up the nut it can be stressed to attain the brake force required at any time. On the recoil of the barrel after firing, the elastic perimeter of the plate spring $g$ is raised from its seat $c'$ by the liquid pressure in the brake cylinder on the piston rod side and provides a free path for the liquid from one side to the other of the piston; the brake force depends in this case on the spring loading of the valve.

In the construction according to Fig. 2, the vertex of the conical plate spring $g$ and the front surface $c'$ are in a direction of the operation of the piston rod, indicated by arrow $x'$, that is, against the direction of flow of the fluid during working stroke. This conical form of the plate spring can be accomplished either by a tensioning of the plate spring $g$ or it can be originally given a conical form, when the force required for chaning the form is already so great for the lifting of the plate spring $g$ from the surface $c'$ of the piston in an untensioned condition that an opening of the passages $f$ and $f'$ follows only during a desired brake pressure. Also, the ends of the passages $f$ under the plate spring $g$ are connected together by an annular groove $f'$ which is brought as close as possible to the rim of the spring, so that the pressure of the liquid is exerted on the plate spring, not only at the ends of the passages, but over the whole annular zone.

In Figure 3, the plate spring does not lie directly on the front surface $c'$ of the piston and the ends of the passages $f$. There is a free annular hollow space left which extends from its circular inner edge at the piston rod $d$ to its outer edge which can be raised against its elastic resistance and lies on the piston surface $c'$. In this way, during the working piston stroke, the liquid pressure is immediately effective over the whole surface of the plate and the braking pressure and force remain constant after the plate spring has been lifted, apart from the variable elastic resistance. For the back flow of the liquid from the reservoir space into the pressure chamber during the return movement of the piston $c$, in the constructions shown either return valves $c^2$ in Figs. 1 and 3 in the piston, or channels $c^3$ in Fig. 2 slotted in known manner in the walls of the piston or brake cylinder can be utilized.

I claim:

1. A hydraulic brake comprising a brake cylinder, a piston adapted to slide in said cylinder and having a pair of series of fluid passages therein, one series of passages being adapted to convey the fluid during the working stroke of the piston and the other for conveying the fluid during return movement of the piston, and a plate spring valve closing the working stroke series of passages and adapted to open when a specific pressure is applied on the fluid in the cylinder by the piston.

2. A hydraulic brake comprising a brake cylinder, a piston adapted to slide in said cylinder and having a plurality of passages therein, and a plate spring valve closing the passages and having a strength so that the valve will not open to allow passage of fluid until a specific pressure is applied on the fluid by the piston.

In testimony whereof I have affixed my signature.

CARL WANINGER.